United States Patent
Yoshida

(10) Patent No.: US 9,883,107 B2
(45) Date of Patent: Jan. 30, 2018

(54) IMAGING APPARATUS

(71) Applicant: OLYMPUS CORPORATION, Hachioji-shi, Tokyo (JP)

(72) Inventor: Shuichi Yoshida, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/372,353

(22) Filed: Dec. 7, 2016

(65) Prior Publication Data

US 2017/0085799 A1 Mar. 23, 2017

Related U.S. Application Data

(63) Continuation of application No. PCT/JP2016/062385, filed on Apr. 19, 2016.

(30) Foreign Application Priority Data

Aug. 7, 2015 (JP) .................................. 2015-157105

(51) Int. Cl.
*H04N 5/232* (2006.01)
*H04N 5/225* (2006.01)
*G03B 5/00* (2006.01)

(52) U.S. Cl.
CPC ........... *H04N 5/23287* (2013.01); *G03B 5/00* (2013.01); *H04N 5/2253* (2013.01);
(Continued)

(58) Field of Classification Search
CPC ........... H04N 5/23287; H04N 5/23264; H04N 5/2327; H04N 5/23258; H04N 5/2253; H04N 5/2254; H04N 5/232; G93B 5/00
(Continued)

(56) References Cited

U.S. PATENT DOCUMENTS

| 5,469,274 A | 11/1995 | Iwasaki et al. |
| 7,450,154 B2 | 11/2008 | Kojima et al. |

(Continued)

FOREIGN PATENT DOCUMENTS

| JP | 05260264 A | 10/1993 |
| JP | 2000013670 A | 1/2000 |

(Continued)

OTHER PUBLICATIONS

International Search Report (ISR) and Written Opinion dated Jul. 19, 2016 issued in International Application No. PCT/JP2016/062385.

(Continued)

*Primary Examiner* — Nhan T Tran
(74) *Attorney, Agent, or Firm* — Holtz Holtz & Volek PC

(57) ABSTRACT

An imaging apparatus includes a shake correction unit, a pixel shift unit, and a controller. The shake correction unit includes a first movable unit and a first position detector, and moves the first movable unit based on outputs of a shake detector and the first position detector. The pixel shift unit includes a second movable unit and a second position detector, and makes a pixel shift correction by moving the second movable unit based on an output of the second position detector. The controller controls the shake correction unit to stop a center of the lens and held by the first movable unit at a position that matches the optical axis. The controller sets a gain for amplifying the output of the first position detector when performing shake correction to be higher than a gain for amplifying the output of the first position detector when making a pixel shift correction.

3 Claims, 7 Drawing Sheets

(52) U.S. Cl.
CPC ........... *H04N 5/2254* (2013.01); *H04N 5/232* (2013.01); *H04N 5/2327* (2013.01); *H04N 5/23258* (2013.01); *G03B 2205/0007* (2013.01)

(58) Field of Classification Search
USPC ...................................................... 348/208.2
See application file for complete search history.

(56) References Cited

U.S. PATENT DOCUMENTS

| | | | | |
|---|---|---|---|---|
| 2007/0014551 A1* | 1/2007 | Fujisawa | ................ | G03B 37/02 396/20 |
| 2009/0040321 A1* | 2/2009 | Nakamura | ......... | H04N 5/23232 348/208.11 |
| 2009/0160958 A1* | 6/2009 | Yamada | ................... | G03B 5/00 348/208.99 |
| 2012/0268642 A1* | 10/2012 | Kawai | .................. | H04N 5/2253 348/335 |
| 2013/0162847 A1* | 6/2013 | Miyazawa | ......... | H04N 5/23287 348/208.1 |
| 2015/0271410 A1* | 9/2015 | Shintani | ............. | H04N 5/23287 348/208.4 |
| 2015/0281582 A1* | 10/2015 | Sakurai | .............. | H04N 5/23287 348/208.2 |

FOREIGN PATENT DOCUMENTS

| | | |
|---|---|---|
| JP | 2001313867 A | 11/2001 |
| JP | 2005128092 A | 5/2005 |
| JP | 2006128780 A | 5/2006 |
| JP | 2007028008 A | 2/2007 |
| JP | 2008134426 A | 6/2008 |
| JP | 2012098493 A | 5/2012 |
| JP | 2013074337 A | 4/2013 |

OTHER PUBLICATIONS

International Search Report (ISR) dated Jul. 19, 2016, issued in International Application No. PCT/JP2016/062385.

* cited by examiner

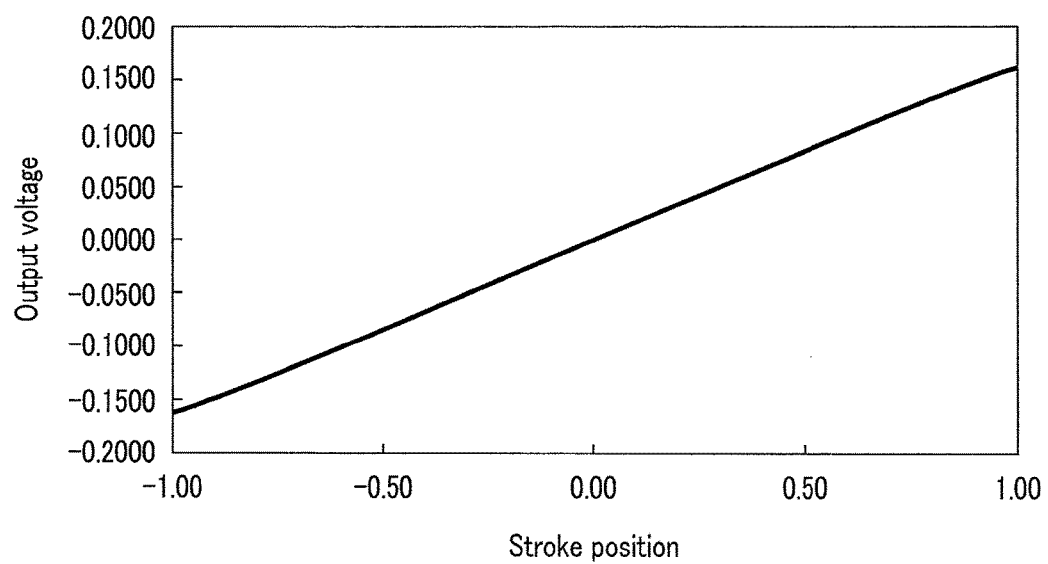
F I G. 4

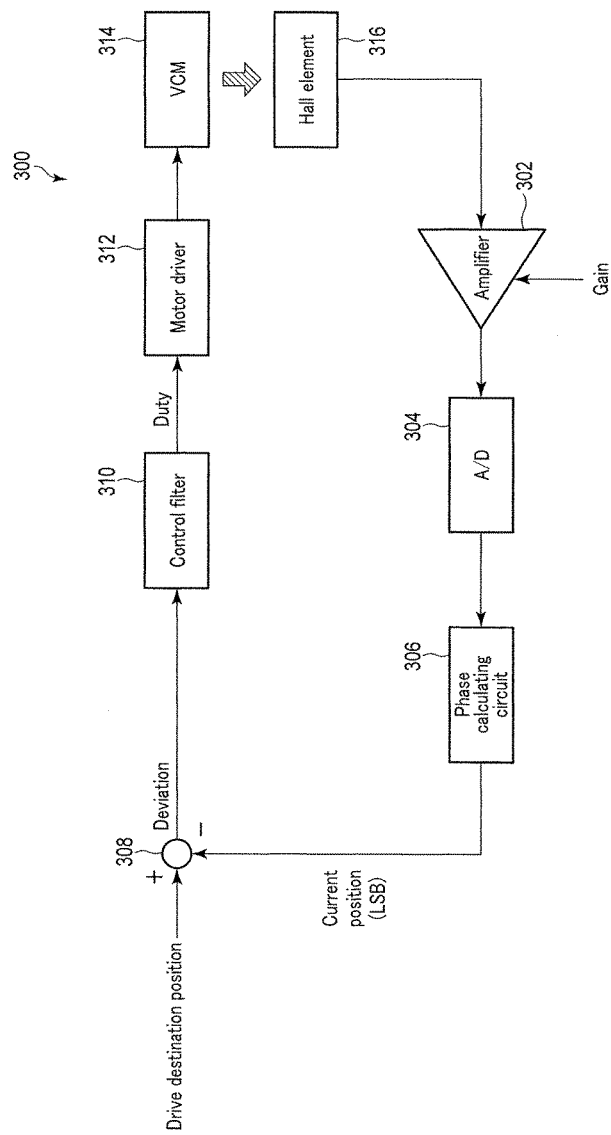
F I G. 5

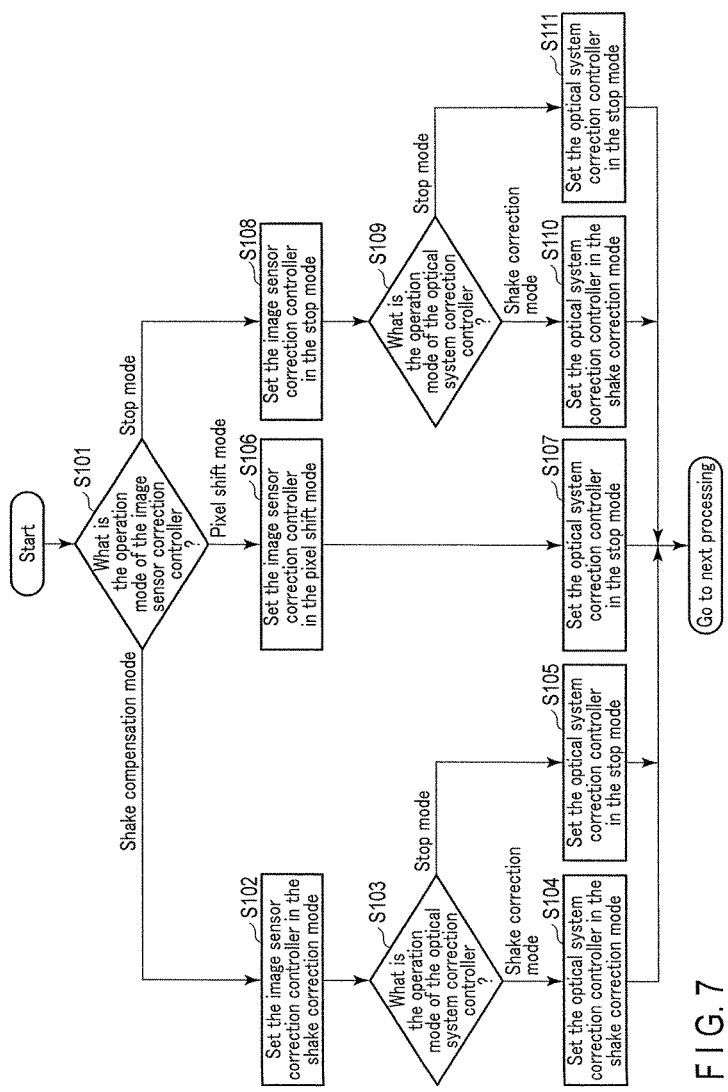
F I G. 7

IMAGING APPARATUS

CROSS-REFERENCE TO RELATED APPLICATIONS

This application is a Continuation Application of PCT Application No. PCT/JP2016/062385, filed Apr. 19, 2016 and based upon and claiming the benefit of priority from the prior Japanese Patent Application No. 2015-157105, filed Aug. 7, 2015, the entire contents of both of which are incorporated herein by reference.

BACKGROUND OF THE INVENTION

1. Field of the Invention

The present invention relates to an imaging apparatus comprising a correction unit for driving an optical lens and a correction unit for driving an image sensor.

2. Description of the Related Art

A camera shake correction unit that reduces blurring caused in a captured image due to a camera shake by moving an image sensor is known. A camera shake correction unit that reduces blurring caused in a captured image due to a camera shake by moving an optical lens is also known. In recent years, combined use of a camera shake correction unit using lens movement and a camera shake correction unit using image sensor movement has been proposed. For example, the camera of Jpn. Pat. Appln. KOKAI Publication No. 2005-128092 performs switching between a camera shake correction unit using lens movement and a camera shake correction unit using image sensor movement in accordance with the condition of the subject.

In recent years, various proposals to use such shake correction units for a purpose other than shake correction have been made. For example, the digital camera of Jpn. Pat. Appln. KOKAI Publication No. 2006-128780 makes pixel correction between pixels of a reference image based on a shift image captured after moving an optical member (imaging optical system) or an image sensor by a predetermined shift amount from the reference image by using a shake correction unit when performing electronic zoom processing. Accordingly, higher resolution can be achieved in electronic zoom processing.

An imaging apparatus according to an aspect of the invention, comprises: a shake detector; a shake correction unit that includes a first movable unit that holds part of a lens of an imaging optical system, and moves the first movable unit in a direction perpendicular to an optical axis based on a detection result of the shake detector to correct for a shake; a position detector that detects a position of the first movable unit; a pixel shift unit that includes a second movable unit that holds an imaging unit, and makes a pixel shift correction by moving the second movable unit in the direction perpendicular to the optical axis; and a controller that controls the shake correction unit to stop the first movable unit of the shake correction unit at a predetermined position while the pixel shift unit is being driven.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 4 shows an example of the relationship between the stroke position of a movable frame and the output voltage of a hall element;

FIG. 5 is a functional block diagram showing a configuration relating to feedback control of the stroke position of the movable frame;

FIG. 7 is a flowchart showing an operation of the imaging apparatus.

DETAILED DESCRIPTION OF THE INVENTION

Figure 1:
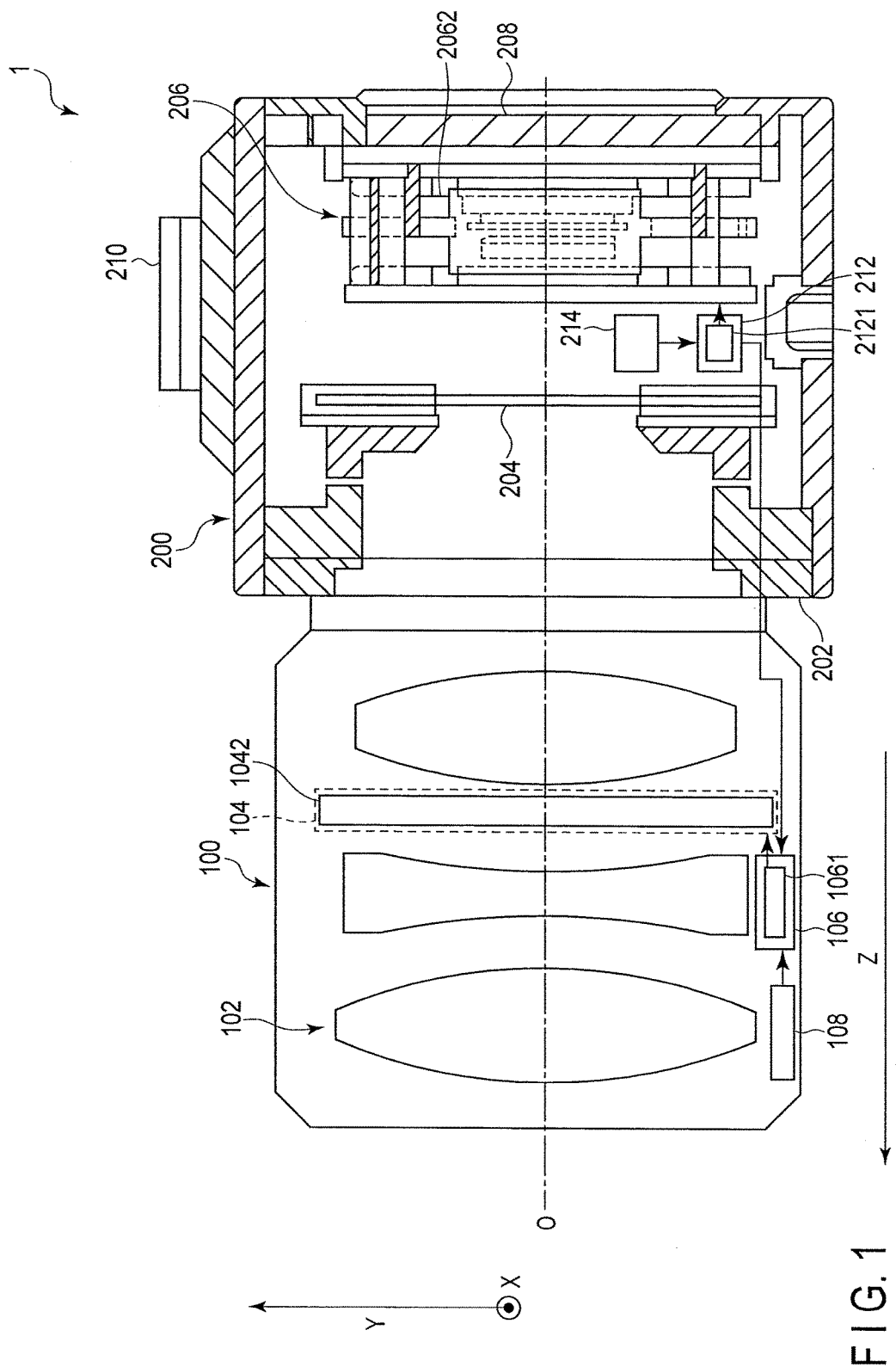
FIG. 1 is a schematic diagram of an imaging apparatus according to one embodiment of the present invention.

Hereinafter, an embodiment of the present invention will be described with reference to the drawings. FIG. 1 is a schematic diagram of an imaging apparatus according to one embodiment of the present invention. The imaging apparatus 1 shown in FIG. 1 includes an interchangeable lens 100 and a main body 200. The interchangeable lens 100 is attached to the main body 200 via a mount 202 provided in the main body 200. The attachment of the interchangeable lens 100 to the main body 200 establishes a communication-enabling connection between the interchangeable lens 100 and the main body 200. Accordingly, the interchangeable lens 100 and the main body 200 cooperatively operate. The imaging apparatus 1 is not necessarily a lens-interchangeable-type imaging apparatus. For example, the imaging apparatus 1 may be a lens-integral-type imaging apparatus.

The interchangeable lens 100 includes an imaging optical system 102, a controller 106, and a shake detector 108. The imaging optical system 102 includes, for example, a plurality of lenses and an aperture, and allows an unillustrated luminous flux from a subject to enter an image sensor of an image sensor correction unit 206 of the main body 200. The imaging optical system 102 of FIG. 1 is made of a plurality of lenses; however, the imaging optical system 102 may be made of one lens. In addition, the imaging optical system 102 may include a focus lens, or may be configured as a zoom lens. In those cases, at least part of the lens of the imaging optical system 102 is movable in a Z direction along the optical axis O.

The imaging optical system 102 of the present embodiment also includes an optical system correction unit 104. The optical system correction unit 104 moves part of the lens of the imaging optical system 102 mounted on a movable frame 1042, which serves as a first movable unit, by a voice coil motor (VCM) using a coil and a magnet. The configuration of the optical system correction unit 104 will be described in detail later.

The controller 106 is made of, for example, a CPU and ASIC, and controls various operations of the interchangeable lens 100. The controller 106 includes an optical system correction controller 1061. The optical system correction controller 1061 controls the optical system correction unit 104.

The shake detector 108 is, for example, a gyrosensor, and detects a shake of the interchangeable lens 100.

The main body 200 includes a shutter 204, an image sensor correction unit 206, a monitor 208, an operating unit 210, a controller 212, and a shake detector 214.

The shutter 204 is a focal plane shutter provided in front (which is the positive side of the Z direction) of the image sensor correction unit 206, for example. By opening the shutter 204, the image sensor of the image sensor correction unit 206 is brought into an exposed state. By closing the shutter 204, the image sensor of the image sensor correction unit 206 is brought into a light blocking state.

The image sensor correction unit 206 includes an imaging unit mounted on movable frame 2062, which serves as a second movable unit. The imaging unit includes, for example, an image sensor. The image sensor captures a subject, not shown to generate a captured image associated with the subject. The image sensor correction unit 206 moves the imaging unit mounted on movable frame 2062, which serves as the second movable unit, by a voice coil motor (VCM) using a coil and a magnet.

The monitor 208 is, for example, a liquid crystal display, and displays an. image based on the captured image generated by the image sensor of the image sensor correction unit 206. The monitor 208 displays a menu screen for enabling a user to make various settings of the imaging apparatus 1. The monitor 208 may include a touch panel.

The operating unit 210 is, for example, a release button. The release button is a button that enables a user to designate a start of imaging by the imaging apparatus 1. The operating unit 210 also includes various operating units other than the release button.

The controller 212 is made of, for example, a CPU and ASIC, and controls the entire operation of the imaging apparatus 1, such as an imaging operation at the imaging apparatus 1. The controller 212 includes an image sensor correction controller 2121. The image sensor correction controller 2121 controls the image sensor correction unit 206.

The shake detector 214 is, for example, a gyrosensor, and detects a shake of the main body 200.

Next, the configurations of the optical system correction unit 104 and the image sensor correction unit 206 will be further described. A lens is mounted on a movable frame to be described later in the optical system correction unit 104, whereas an imaging unit is mounted on the movable frame in the image sensor correction unit 206. Other than this, there is no large difference between the optical system correction unit 104 and the image sensor correction unit 206. Therefore, only the configuration of the optical system correction unit 104 will be described below, and descriptions of the configuration of the image sensor correction unit 206 will be omitted.

Figure 2:
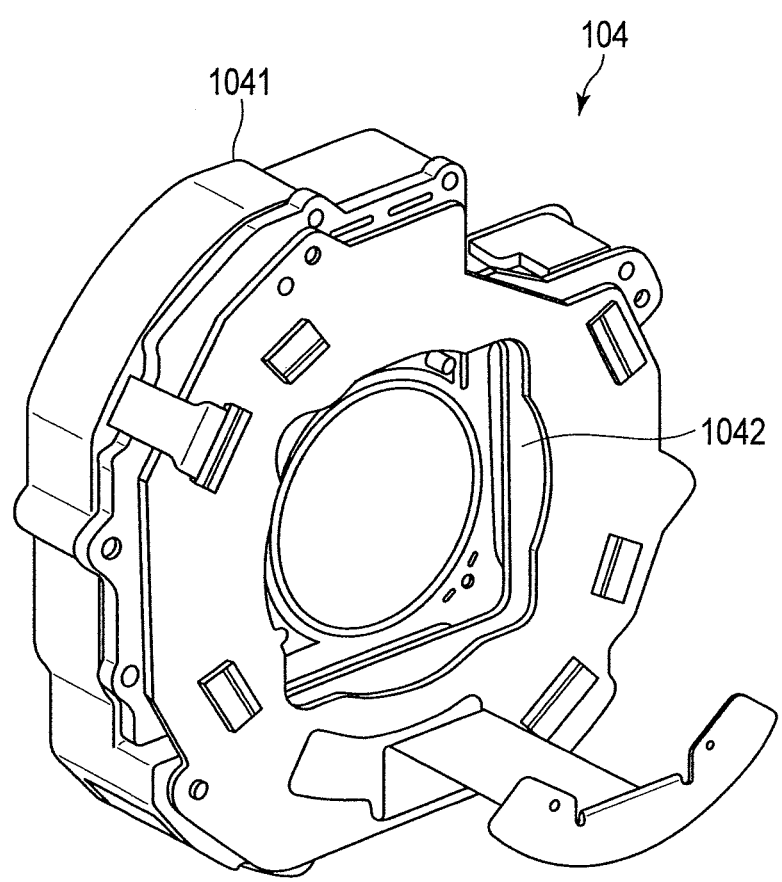
FIG. 2 shows an assembled state of an optical system correction unit.

FIG. 2 shows an assembled state of the optical system correction unit 104. As shown in FIG. 2, the optical system correction unit 104 generally includes a fixed frame 1041 and a movable frame 1042. The optical system correction unit 104 moves the movable frame 1042 parallel on a plane (defined by the X direction and Y direction in FIG. 1) perpendicular to the optical axis O.

Figure 3:
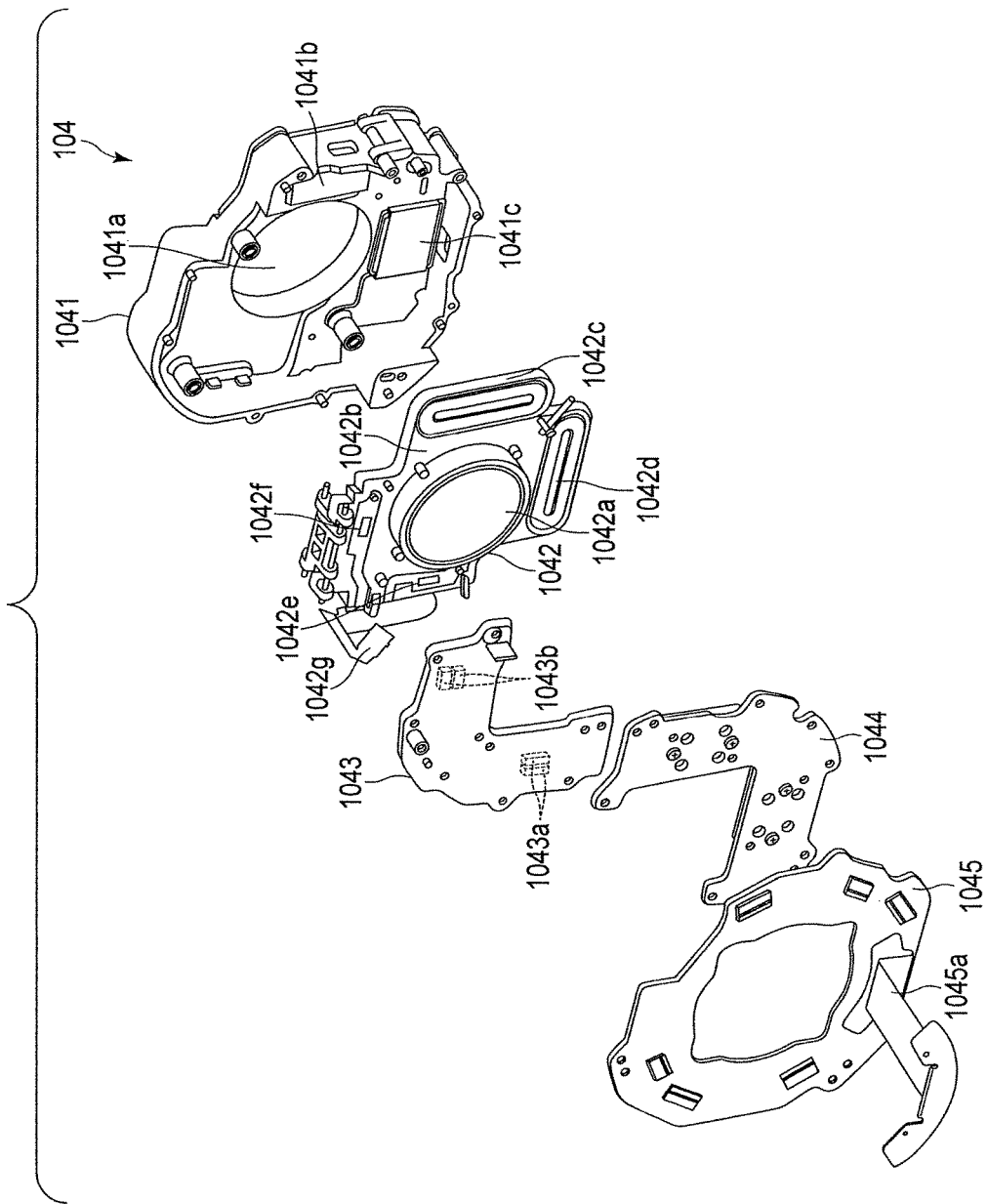
FIG. 3 is an exploded perspective view of the optical system correction unit.

FIG. 3 is an exploded perspective view of the optical system correction unit 104. As shown in FIG. 3, the optical system correction unit 104 particularly includes a fixed frame 1041, a movable frame 1042, a hall lid 1043, a yoke 1044, and a lens main substrate 1045. When viewed from the subject side, they are assembled in the order of fixed frame 1041, movable frame 1042, hall lid 1043, yoke 1044, and lens main substrate 1045. In the following explanation, the up, down, right, and left directions of the figure are defined based on the view from the imaging side.

The fixed frame 1041 includes an approximate octagonal main body having an opening 1041a for a lens in its center, and is fixed to the main body of the interchangeable lens 100. An X magnet 1041b and a Y magnet 1041c are attached to the outer circumference of the fixed frame 1041. The X magnet 1041b is provided on the right (or left) outer circumference of the surface of the fixed frame 1041 facing the movable frame 1042 with its longitudinal side corresponding to the Y-axis direction. The Y magnet 1041c is provided on the lower (or upper) outer circumference of the surface of the fixed frame 1041 facing the movable frame 1042 with its longitudinal side corresponding to the X-axis direction.

The movable frame 1042 includes an approximate cross-shaped main body 1042b having an opening in its center. A lens 1042a is provided in the opening portion of the movable frame 1042. An X coil 1042c is provided in the main body 1042b at a position corresponding to the X magnet 1041b. In addition, a Y coil 1042d is provided in the main body 1042b at a position corresponding to the Y magnet 1041c. The X coil 1042c is provided to correspond to the X magnet 1041b with its longitudinal side corresponding to the Y-axis direction. The Y coil 1042d is provided to correspond to the Y magnet 1041c with its longitudinal side corresponding to the X-axis direction. An X hall element 1042e, which serves as a position detector, is provided in the main body 1042b at a symmetrical position of the position of the X coil 1042c with respect to the lens 1042a. In addition, a Y hall element 1042f, which also serves as a position detector, is provided in the main body 1042b at a symmetrical position of the position of the Y coil 1042d with respect to the lens 1042a. The X coil 1042c, the Y coil 1042d, the X hall element 1032e, and the Y hall element 1042f are connected to a flexible printed circuit 1042g.

The hall lid 1043 is an L-shaped plate member set on the main body 1042b to be opposed to the X hall element 1042e and the Y hall element 1042f. An X hall magnet 1043a is provided on a back surface of the hall lid 1043 at a position corresponding to the X hall element 1042e. In addition, a Y hall magnet 1043b is provided on the back surface of the hall lid 1043 at a position corresponding to the Y hall element 1042f.

The yoke 1044 is an L-shaped plate member made of a soft magnetic material and set on the main body 1042b to be opposed to the X coil 1042c and the Y coil 1042d, and forms a magnetic circuit between the X magnet 1041b and the Y magnet 1041c by being set on the movable frame 1042. It is possible to further provide an X magnet on a back surface of the yoke 1044 at a position corresponding to the X magnet 1041b, and a Y magnet on the back surface of the yoke 1044 at a position corresponding to the Y magnet 1041c. This configuration can increase the drive power of the VCM.

The lens main substrate 1045 is set on the fixed frame 1041 to interpose the movable frame 1042 between the lens main substrate 1045 and the fixed frame 1041, and is fixed to the main body of the interchangeable lens 100. In this state, the X magnet 1041b and Y magnet 1041c of the fixed frame 1041 are out of contact with the X coil 1042c and Y coil 1042d of the movable frame 1042. In addition, a controller 106 (not shown) is mounted on the lens main substrate 1045, and is connected to the X coil 1042c and Y coil 1042d, and to the X hall element 1032e and Y hall element 1042f via the flexible printed circuit 1042g. Moreover, a flexible printed circuit 1045a is provided on the lens main substrate 1045. The flexible printed circuit 1045*a* is connected to the main body 200 via the mount 202.

With this configuration, when a current is started to be applied to either one of the X coil 1042*c* and the Y coil 1042*d*, the movable frame 1042 is brought into a floating state with respect to the fixed frame 1041. Controlling the magnitude of the drive current applied to the X coil 1042*c* and the Y coil 1042*d* in this state causes the movable frame 1042 to move parallel on the plane orthogonal to the optical axis O.

As the movable frame 1042 moves, the relative positional relationship between the X hall element 1042*e* and the X hall magnet 1043*a* and that between the Y hall element 1042*f* and the Y hall magnet 1043*b* change. Accordingly, the strength of the magnetic field of the X hall magnet 1043*a* which influences the X hall element 1042*e* and the strength of the magnetic field of the Y hall magnet 1043*b* which influences the Y hall element 1042*f* each change. The strength of a magnetic field that influences a hall element is proportional to the magnitude of the voltage output from the hall element. Therefore, the position of the movable frame 1042 can be detected from the strength of the voltage signal output from the hall element by associating the stroke position of the movable frame 1042 and the output voltage of the hall element as shown in FIG. 4. The movable frame 1042 can be driven to any stroke position by controlling the magnitude of the drive current applied to the X coil 1042*c* and the Y coil 1042*d* in accordance with the detected stroke position of the movable frame 1042.

FIG. 5 is a functional block diagram showing a configuration relating to feedback control of the stroke position of the movable frame. The feedback controller of FIG. 5 is provided in, for example, the optical system correction controller 1061 and the image sensor correction controller 2121. For example, when the movable frame 1042 is driven, the feedback controller of the optical system correction controller 1061 performs feedback control.

The feedback controller 300 shown in FIG. 5 includes an amplifier 302, an A/D converter 304, a phase calculating circuit 306, a subtractor 308, a control filter 310, and a motor driver 312. The number of feedback controllers 300 shown in FIG. 5 is the same as that of VCMs. In the present embodiment, only the configuration corresponding to one VCM will be described. In FIG. 5, one of the VCMS (each formed by a set of X magnet and X coil or a set of Y magnet and Y coil) is shown as VCM 314, and one of the hall elements (X hall element or Y hall element) is shown as hall element 316.

The amplifier 302 amplifies an analog signal (position detection signal) output from the hall element 316 in accordance with the gain set by controller 106 or controller 212. The A/D converter 304 converts a position detection signal after amplification, which is output from the amplifier 302, into a digital signal. The phase calculating circuit 306 calculates a current position signal indicating a current position of the movable frame 1042 in accordance with the digital signal obtained by conversion at the A/D converter 304.

Figure 6:
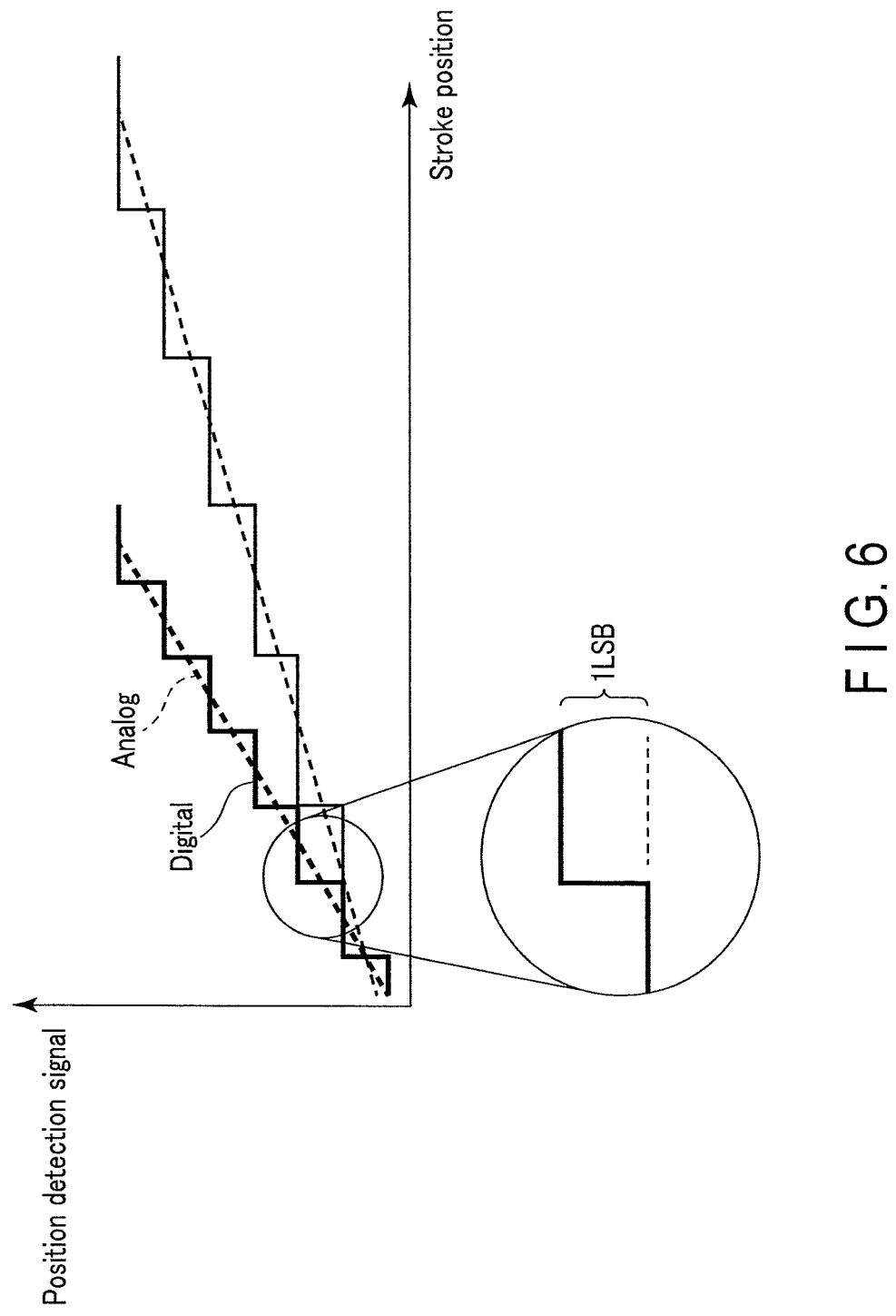
FIG. 6 shows a relationship between the gain of an amplifier and a position detection resolution.

As described above, the strength of the magnetic field that influences the hall element 316 is proportional to the output voltage of the hall element 316. However, the output voltage of the hall element 316 is extremely small. Therefore, the analog signal from the hall element 316 is first amplified in the amplifier 302, and then converted into a digital signal in the A/D converter 304. The position detection resolution changes by changing the gain. FIG. 6 shows a relationship between the gain of the amplifier 302 and the position detection resolution. The thick line in FIG. 6 indicates change of the position detection signal relative to the change of the stroke position of the movable frame in the case of high gain. The thin line in FIG. 6 indicates change of the position detection signal relative to the change of the stroke position of the movable frame in the case of low gain. In FIG. 6, the position detection signal before digitalization is indicated by a broken line and that, after digitalization, is indicated by a solid line.

As shown in FIG. 6, the change of the position detection signal relative to the change of the stroke position of the movable frame in the case where a high gain is set, is larger than the change of the position detection signal relative to the change of the stroke position of the movable frame in the case where a low gain is set. This means that the position detection resolution increases (the length of 1LSB of the digital signal decreases) as the gain increases. Therefore, when the position of the movable frame needs to be controlled with high precision, it is effective to increase the gain.

The range of detectable stroke position is narrowed by increasing the gain. Therefore, increase of the gain makes wide range position control of the movable frame difficult. Accordingly, when a relatively wide range position control of the movable frame is required, it is effective to decrease the gain.

The subtractor 308 outputs, to the control filter 310, a deviation signal between a drive destination position signal indicating a drive destination position of the movable frame input by, for example, controller 106 or controller 212 and the current position signal generated at the phase calculating circuit 306.

The control filter 310 includes a digital filter formed by, for example, a combination of a plurality of infinite impulse response (IIR) filters, and outputs a drive current value based on the deviation signal output from the subtractor 308 to the motor driver 312. The drive current value is a value of a current that needs to be applied to a relevant coil for driving the movable frame 1042 to a destination position, and is generated by applying the digital filter to the deviation signal. The application of the digital filter brings the drive current value to a desired state suitable for the characteristics of the VCM 314.

The motor driver 312 supplies a current to a relevant coil of the movable frame, based on the drive current value output from the control filter 310. The motor driver 312 pulse width modulation (PWM)-drives the VCM 314 (in actuality, the coil forming the VCM 314) based on the drive current value output from the control filter 310. In this case, the drive current value is a value indicating, for example, a duty of the PWM drive.

Hereinafter, an operation of the imaging apparatus 1 of the present embodiment will be described. FIG. 7 is a flowchart showing an operation of the imaging apparatus 1. The processing of FIG. 7 is performed by a cooperative operation of controller 106 and controller 212.

In step S101, controller 212 determines the operation mode of the image sensor correction controller 2121. The image sensor correction controller 2121 of the present embodiment has at least a shake correction mode, a stop mode, and a pixel shift mode.

In the shake compensation mode of the image sensor correction controller 2121, the image sensor correction unit 206 is controlled to move the imaging unit mounted on the movable frame (movable frame 2062 of the image sensor correction unit 206), which serves as the second movable unit, in accordance with the output of the shake detector 214 in order to reduce blurring caused in a captured image due to camera shake, etc. Namely, in the shake correction mode of the image sensor correction controller 2121, the image sensor correction unit 206 functions as a shake correction unit.

In the stop mode of the image sensor correction controller 2121, the position of the movable frame (movable frame 2062 of the image sensor correction unit 206), which serves as the second movable unit, is controlled to stop the movable frame (movable frame 2062 of the image sensor correction unit 206), which serves as the second movable unit, at a predetermined regular fixed position. The regular fixed position is, for example, an optical center position. The "stop" of the stop mode of the image sensor correction controller 2121 indicates controlling the amount of movement of the movable frame to fall within a range that is regarded as giving no influence on the captured image.

In the pixel shift mode of the image sensor correction controller 2121, the image sensor correction unit 206 is controlled to capture multiple times while moving the image sensor mounted on the movable frame (movable frame 2062 of the image sensor correction unit 206), which serves as the second movable unit, by a half pitch of one pixel with high precision, and synthesize a plurality of captured images obtained by the capturing of multiple times to make a pixel shift correction for obtaining a high resolution captured image. Namely, in the pixel shift mode of the image sensor correction controller 2121, the image sensor correction unit 206 functions as a pixel shift unit.

Those three modes are set by, for example, a user's selection at the imaging apparatus 1. When shake correction by controlling the image sensor correction unit 206 is designated by a user (including the case where shake correction using the optical system correction unit 104 and the image sensor correction unit 205 in combination is designated), controller 212 determines that the operation mode should be the shake correction mode. In this case, the processing moves to step S102. When pixel shift capturing is designated by a user, controller 212 determines that the operation mode should be the pixel shift mode. In this case, the processing moves to step S106. When neither shake compensation nor pixel shift capture by controlling the image sensor correction unit 206 is designated, controller 212 determines that the operation mode should be the stop mode. In this case, the processing moves to step S108.

In step S102, controller 212 sets the image sensor correction controller 2121 in the shake correction mode. In setting the shake correction mode, controller 212 sets the gain of the amplifier 302 of the image sensor correction controller 2121 to a gain for the shake correction mode. The gain for the shake correction mode is smaller than the gain for the pixel shift mode. In the shake correction mode, a small gain is set because position control in a wide range, rather than precision, is required. In practice, the gain is set in accordance with a required position detection resolution. For example, when the position detection resolution required for the shake correction mode is 0.6 µm/LSB, the gain of the amplifier 302 is set to provide the position detection resolution of 0.6 µm/LSB.

In step S103, controller 106 determines the operation mode of the optical system correction controller 1061. The optical system correction controller 1061 of the present embodiment has at least a shake correction mode, and a stop mode.

In the shake correction mode of the optical system correction controller 1061, the optical system correction unit 104 is controlled to move the lens mounted on the movable frame (movable frame 1042 of the optical system correction unit 104) which serves as the first movable unit, in accordance with the output of the shake detector 108 in order to reduce blurring caused in a captured image due to camera shake, etc. Namely, in the shake correction mode of the optical system correction controller 1061, the optical system correction unit 104 functions as a shake correction unit.

In the stop mode of the optical system correction controller 1061, the position of the movable frame (movable frame 1042 of the optical system correction unit 104), which serves as the first movable unit, is controlled with high precision to stop the movable frame (movable frame 1042 of the optical system correction unit 104), which serves as the first movable unit, at a predetermined regular fixed position. The regular fixed position is, for example, an optical center position. The "stop" of the stop mode of the optical system correction controller 1061 also indicates controlling the amount of movement of the movable frame to fall within a range that is regarded as giving no influence on the captured image. In the present embodiment, when the image sensor correction controller 2121 is set in the pixel shift mode, the optical system correction controller 1061 is set in the stop mode, which will be described in detail later. The pixel shift mode requires high precision position control of the movable frame. To perform the high precision position control of the movable frame (movable frame 2062 of the image sensor correction unit 206), which serves as the second movable unit, the movable frame (movable frame 1042 of the optical system correction unit 104), which serves as the first movable unit, needs to be stopped with high precision with respect to the movable frame (movable frame 2062 of the image sensor correction unit 206), which serves as the second movable unit. To perform such high precision stop control, higher precision stop control of the movable frame is performed in the stop mode of the optical system correction controller 1061 than in the stop mode of the image sensor correction controller 2121.

Those two modes are set by, for example, controller 212. When shake correction using the optical system correction unit 104 and the image sensor correction unit 206 in combination is designated by a user, controller 212 instructs controller 106 to set the operation mode of the optical system correction controller 1061 to the shake correction mode. Based on this instruction, controller 106 determines that the operation mode should be the shake correction mode. In this case, the processing moves to step S104. When shake correction by controlling the optical system correction unit 104 is not designated, controller 212 instructs controller 106 to set the operation mode of the optical system correction controller 1061 to the stop mode. Based on this instruction, controller 106 determines that the operation mode should be the stop mode. In this case, the processing moves to step S105.

In step S104, controller 106 sets the optical system correction controller 1061 in the shake correction mode. Then, the processing of FIG. 7 ends. In setting the shake correction mode, controller 106 sets the gain of the amplifier 302 of the optical system correction controller 1061 to that for the shake correction mode. The gain for the shake correction mode is smaller than the gain for the stop mode. In the shake correction mode, a small gain is set because position control in a wide range, rather than precision, is required. In practice, the gain is set in accordance with a required position detection resolution. For example, when the position detection resolution required for the shake correction mode is 0.6 µm/LSB, the gain of the amplifier 302 is set to provide the position detection resolution of 0.6 µm/LSB. After such setting, shake correction using the optical system correction unit 104 and the image sensor correction unit 206 in combination is performed. This processing is well known, and a description thereof will be omitted. In the case of shake correction using the optical system correction unit 104 and the image sensor correction unit 206 in combination, it is possible to, for example, improve the number of correction stages of shake correction by cooperative control of the optical system correction unit 104 and the image sensor correction unit 206. In step S105, controller 106 sets the optical system correction controller 1061 in the stop mode. Then, the processing of FIG. 7 ends. In setting the stop mode, controller 106 sets the gain of the amplifier 302 of the optical system correction controller 1061 to that for the stop mode. The gain for the stop mode is higher than the gain for the shake correction mode. This enables high precision stop control. In practice, the gain is set in accordance with a required position detection resolution. For example, when the position detection resolution required for the pixel shift mode is 0.4 μm/LSB, the position detection resolution required for the stop mode of the optical system correction controller 1061 is also 0.4 μm/LSB. The gain of the amplifier 302 is set to provide the position detection resolution of 0.4 μm/LSB. After such setting, shake correction using the image sensor correction unit 206 is performed. This processing is well known, and a description thereof will be omitted.

In step S106, controller 212 sets the image sensor correction controller 2121 in the pixel shift mode. In setting the pixel shift mode, controller 212 sets the gain of the amplifier 302 of the image sensor correction controller 2121 to that for the pixel shift mode. The gain for the pixel shift mode is higher than the gain for the shake correction mode. In the pixel shift mode, a large gain is set because high precision position control is required. In practice, the gain is set in accordance with a required position detection resolution. For example, when the position detection resolution required for the pixel shift mode is 0.4 μm/LSB, the gain of the amplifier 302 is set to provide the position detection resolution of 0.4 μm/LSB.

In step S107, controller 106 sets the optical system correction controller 1061 in the stop mode. Then, the processing of FIG. 7 ends. In setting the stop mode, controller 106 sets the gain of the amplifier 302 of the optical system correction controller 1061 to that for the stop mode. As described above, the gain for the stop mode of the optical system correction controller 1061 is higher than the gain for the shake correction mode. After such setting, pixel shift capture using the image sensor correction unit 206 is performed. This processing is well known, and a description thereof will be omitted.

In step S108, controller 212 sets the image sensor correction controller 2121 in the stop mode. In setting of the stop mode, controller 212 sets the gain of the amplifier 302 of the image sensor correction controller 2121 to that for the stop mode. The "stop" of the stop mode of the image sensor correction controller 2121 indicates controlling the amount of movement of the movable frame to fall within a range that is regarded as giving no influence on the captured image. If such position control of the movable frame can be performed with the position detection resolution of the shake correction mode, the gain of the stop mode may be the same as that of the shake correction mode. If such position control of the movable frame cannot be performed without the position detection resolution of the pixel shift mode, the gain of the stop mode needs to be the same as that of the pixel shift mode. Of course, the gain of the stop mode may be different from either one of the gain of the shake correction mode and that of the pixel shift mode.

In step S109, controller 106 determines the operation mode of the optical system correction controller 1061. When shake correction using the optical system correction unit 104 is designated by a user, controller 212 instructs controller 106 to set the operation mode of the optical system correction controller 1061 to the shake correction mode. Based on this instruction, controller 106 determines that the operation mode should be the shake correction mode. In this case, the processing moves to step S110. When shake correction by controlling the optical system correction unit 104 is not designated, controller 212 instructs controller 106 to set the operation mode of the optical system correction controller 1061 to the stop mode. Based on this instruction, controller 106 determines that the operation mode should be the stop mode. In this case, the processing moves to step S111.

In step S110, controller 106 sets the optical system correction controller 1061 in the shake correction mode. Then, the processing of FIG. 7 ends. In setting of the shake correction mode, controller 106 sets the gain of the amplifier 302 of the optical system correction controller 1061 to that for the shake correction mode. After such setting, shake correction using the optical system correction unit 104 is performed. This processing is well known, and a description thereof will be omitted.

In step S111, controller 106 sets the optical system correction controller 1061 in the stop mode. Then, the processing of FIG. 7 ends. In setting the stop mode, controller 106 sets the gain of the amplifier 302 of the optical system correction controller 1061 to that for the stop mode. In the case of such setting, the movable frame 1042 of the optical system correction unit 104 and the movable frame 2062 of the image sensor correction unit 206 are both controlled to stop at the regular fixed position (optical center position).

As described above, according to the present embodiment, in an imaging apparatus including an optical system correction unit 104 and an image sensor correction unit 206, when a pixel shift correction is made by the image sensor correction unit 206, control to stop the movable frame 1042 of the optical system correction unit 104 with high precision is performed. In the case where the movable frame is moved by a VCM, control to stop the movable frame causes a shake of the movable frame within the range of a tiny deviation amount. However, stop control with an increased position detection resolution enables stopping the movable frame with the same precision as when mechanically fixing the movable frame. Accordingly, pixel shift by the image sensor correction unit 206 is performed with high precision.

In the above-described embodiment, the image sensor correction unit 206 is stopped by the feedback control of the VCM in the stop mode of the image sensor correction controller 2121. However, the image sensor correction unit 206 may be configured to be stopped by a mechanical mechanism in the stop mode of the image sensor correction controller 2121.

In the above-described embodiment, a pixel shift correction is made by using the image sensor correction unit 206. However, the pixel shift correction may be performed by using the optical system correction unit 104. In this case, the gain is set to provide a high position detection resolution in the stop mode of the image sensor correction controller 2121.

In the above-described embodiment, the position detection resolution is changed based on the setting of the gain of the amplifier 302. However, the position detection resolution may be changed by increasing the drive voltage or drive current of the hall element 316. In addition, the position detection resolution may be changed based on both the setting of the gain of the amplifier 302 and setting of the hall element 316. Furthermore, it is possible to increase responsiveness at the time of stop control by changing the gain of the control filter 310 so as to stop the movable frame in a shorter time.

The present invention has been described based on the above-described embodiments: however, the present invention is not limited to the above-described embodiments, and various modifications or applications can, of course, be made within the spirit of the present invention. For example, the above-described configuration of the optical system correction unit 104 is an example, and may be changed as appropriate. For example, the configuration of the VCM may be different. For example, a magnet for position detection is provided in the fixed frame, and a hall element is provided in the movable frame in the above-described example. However, a magnet for position detection may be provided in the movable frame, and a hall element may be provided in the fixed frame.

What is claimed is:

1. An imaging apparatus, comprising:
   a shake correction unit that includes a first movable unit that holds part of a lens of an imaging optical system and a first position detector that detects a position of the movable unit, and moves the first movable unit in a direction perpendicular to an optical axis based on outputs of a shake detector and the first position detector;
   a pixel shift unit that includes a second movable unit that holds an imaging unit and a second position detector that detects a position of the second movable unit, and makes a pixel shift correction by moving the second movable unit in the direction perpendicular to the optical axis based on a detection result of the second position detector; and
   a controller that controls the shake correction unit to stop a center of the lens forming the shake correction unit and held by the first movable unit at a position that matches the optical axis based on the output of the first position detector when the pixel shift unit is driven, wherein
   when making the pixel shift correction, the controller sets a gain for amplifying the output of the first position detector when performing shake correction to be higher than a gain for amplifying the output of the first position detector when making a pixel shift correction.

2. The imaging apparatus according to claim 1, wherein when amplifying an output of the first or second position detector, the controller amplifies the output so that an output voltage of an amplifier is large with respect to a movement amount per unit of the first or second movable unit.

3. The imaging apparatus according to claim 1, wherein the pixel shift unit also has a shake correction function of correcting for the shake by moving the second movable unit in the direction perpendicular to the optical axis based on a detection result of the shake detector.

* * * * *